US011214177B2

(12) United States Patent
Touzet (10) Patent No.: US 11,214,177 B2
(45) Date of Patent: Jan. 4, 2022

(54) ROTATIONAL DEVICE FOR A VEHICLE SEAT (71) Applicant: FAURECIA AUTOSITZE GMBH, Stadthagen (DE)

(72) Inventor: Bertrand Touzet, Pollhagen (DE)

(73) Assignee: Faurecia Autositze GmbH, Stadthagen (DE)

(*) Notice: Subject to any disclaimer, the term of this patent is extended or adjusted under 35 U.S.C. 154(b) by 0 days.

(21) Appl. No.: 16/891,113

(22) Filed: Jun. 3, 2020

(65) Prior Publication Data
US 2020/0384896 A1    Dec. 10, 2020

(30) Foreign Application Priority Data

Jun. 7, 2019  (DE) .................. 10 2019 115 602.5

(51) Int. Cl.
B60N 2/14        (2006.01)
F16C 19/36       (2006.01)

(52) U.S. Cl.
CPC .............. B60N 2/14 (2013.01); F16C 19/36 (2013.01); F16C 2326/08 (2013.01)

(58) Field of Classification Search
CPC . B60N 2/14; F16C 19/36; F16C 19/22; F16C 19/34; F16C 2326/08
USPC ........................................ 297/344.24, 344.26
See application file for complete search history.

(56) References Cited

U.S. PATENT DOCUMENTS 3,973,799 A * 8/1976 Berg .................... B60N 2/0292
                                                                  297/341
4,792,188 A * 12/1988 Kawashima .......... B60N 2/146
                                                                  297/344.26
6,021,989 A * 2/2000 Morita .................. B60N 2/143
                                                                  248/349.1

(Continued)

FOREIGN PATENT DOCUMENTS

DE           4343277 A1     6/1994
DE     102010000868 B4     7/2010
(Continued)

Primary Examiner — Mark R Wendell
(74) Attorney, Agent, or Firm — Barnes & Thornburg LLP (57) ABSTRACT The present disclosure relates to a rotational device for a vehicle seat having an upper connecting element and a lower connecting element, a ring shaped profile rail, where the ring shaped profile rail is guided by several rollers in a manner rotatable about a rotational axis, where the several rollers are each mounted in a manner rotatable about roller axes, and the rollers are in contact with interior contact surfaces of the profile rail in such a way that the rollers upon rotation of the profile rail roll off on the interior contact surfaces, thereby guiding the profile rail in its rotational movement about the rotational axis, whereby the upper connecting element is connected to the lower connecting element via the rotatable guided ring shaped profile rail in such a way that these can be twisted in relation to one another.

According to the present disclosure it is provided for that the roller axes of the several rollers to be determined such that the rollers are in contact with and roll off on several interior contact surfaces of the profile rail with different orientations, whereby each roller in and of itself can be in contact with and roll off on merely one of the several interior contact surfaces of the profile rail.

20 Claims, 7 Drawing Sheets (56) References Cited

U.S. PATENT DOCUMENTS

| | | | | |
|---|---|---|---|---|
| 8,033,589 B2* | 10/2011 | Kusanagi | ............... | B60N 2/067 296/68.1 |
| 8,998,326 B2* | 4/2015 | DeCraene | ................ | B60N 2/14 297/344.24 |
| 9,211,812 B2* | 12/2015 | Haller | .................... | B60N 2/015 |
| 9,579,995 B2* | 2/2017 | Haller | ................. | F16C 33/3856 |
| 9,663,001 B2* | 5/2017 | Haller | ...................... | B60N 2/08 |
| 10,926,669 B2* | 2/2021 | Aktas | .................... | B60N 2/143 |
| 2006/0158003 A1* | 7/2006 | Nomura | ............. | E05D 15/0691 296/155 |
| 2008/0185229 A1 | 8/2008 | Panzarella | | |
| 2015/0137572 A1* | 5/2015 | Auger | .................... | B60N 2/245 297/344.21 |

FOREIGN PATENT DOCUMENTS

| | | | |
|---|---|---|---|
| DE | 102015008649 A1 | 1/2016 | |
| EP | 0400085 B1 | 12/1990 | |
| JP | 02037051 A | 2/1990 | |
| JP | 2585735 B2 | 2/1997 | |
| WO | 2010048260 A1 | 4/2010 | |

\* cited by examiner

ROTATIONAL DEVICE FOR A VEHICLE SEAT

PRIORITY CLAIM

This application claims priority to German Patent Application No. DE 10 2019 115 602.5, filed Jun. 7, 2019, which is expressly incorporated by reference herein.

BACKGROUND

The present disclosure relates to a rotational device for a vehicle seat as a vehicle seat including such a rotational device.

SUMMARY

According to the present disclosure, a rotational device for a vehicle seat allows a simple and reliable assembly with little expenditure in terms of assembly and materials while allowing for a reliable and comfortable rotation of the vehicle seat.

In illustrative embodiments, it is provided for the roller axes of the several rollers to be determined such that the rollers are in contact with and can roll off on several interior contact surfaces of the profile rail with differing orientations so as to achieve a holding or, respectively, guiding of the profile rail and, therewith, a restriction of movement, preferably solely on the rotational degree of freedom about the rotational axis, whereby each individual roller is in contact with and rolls off on only one of the several interior contact surfaces of the profile rail.

In illustrative embodiments, each roller is able, by virtue of being in contact with the respective one interior contact surface of the profile rail, to provide for a guiding or, respectively, bearing and, therewith, for a restriction of movement in this one direction. Due to the fact that each roller is in contact with only one contact surface and acts to restrict movement in a certain direction, the rotational device can be adjusted and mounted in a simpler manner because each roller axis may be adjusted to merely one contact surface or, respectively, only one direction.

In illustrative embodiments, the term interior contact surfaces with differing orientations shall be understood to mean that the profile rail comprises interior contact surfaces oriented, for example, in vertical and lateral directions, and the rollers are in contact with these interior contact surfaces with differing orientations. Likewise, a diagonal orientation is possible. By virtue of this differing orientation in at least two directions it is possible, advantageously, to attain a guiding or, respectively, bearing of the profile rail and, therewith, a restriction of movement at least in these two differing directions, with each roller being responsible for the guiding in only one of the directions.

In illustrative embodiments, the rotational device is based on a generic rotational device for a vehicle seat comprising at least one upper connecting element for connecting, i.e. creating an indirect or direct attachment, the rotational device to the vehicle seat and at least one lower connecting element for connecting the rotational device to a vehicle floor, as well as a ring shaped profile rail, the ring shaped profile rail being rotatable guided or, respectively, mounted by a several rollers about a rotational axis, preferably the axis of symmetry of the profile rail. Hereby, the several rollers are each mounted rotatable about roller axes, and the rollers are in contact with interior contact surfaces with interior contact surfaces of the profile rail in such a way that, when the profile rail rotates, the rollers roll off on the interior contact surfaces and can thereby guide, or, respectively, bear the profile rail in its rotational movement about the rotational axis, whereby the upper connecting element is connected via the rotatable guided ring shaped profile rail to the lower connecting element in such a way that these can be twisted against one another about the rotational axis and can thereby cause the vehicle seat to rotate. This, preferably, allows for a complete rotation of the profile rail and, therewith, of the vehicle seat.

In illustrative embodiments, it is provided for the roller axes of the rollers to be fixed in such a way that first roller axes of first rollers and third roller axes of third rollers each extend in a lateral direction, i.e. perpendicular to the rotational axis or, respectively, to the axis of symmetry, and second roller axes of second rollers run in a vertical direction, i.e. parallel to the rotational axis or, respectively, to the axis of symmetry, whereby the first and the third roller axes are fixed in such a way that the first and the third rollers are in contact with the profile rail each in a vertical direction, and the second roller axes are fixed in such a way that the second rollers are in contact with the profile rail each in a lateral direction. Consequently, three different kinds of rollers for guiding the profile rail are provided which differ from one another by their orientation. By virtue of the differing orientation at least in vertical and lateral direction alone it is possible to attain a restriction of movement in these two directions.

In illustrative embodiments, in order to attain a full restriction of movement the different rollers may, for example, be in contact with correspondingly oriented interior contact surfaces in the vertical direction from above or from below, so as to prevent any motion of the profile rail vertically upwards as well as downwards. To that end, the laterally extending first roller axes of the first rollers are vertically offset against the laterally extending third roller axes of the third rollers by an offset such that the first rollers are in contact, in the vertical direction, with other interior contact surfaces on the profile rail as the third rollers.

In illustrative embodiments, in order to be able to form the interior contact surfaces in this way the ring shaped profile rail is designed as a C shaped or U shaped ring shaped profile rail with an upper bar, a central flange, and a lower bar, with the upper bar forming a first interior contact surface, the central flange a second interior contact surface, and the lower bar forming a third interior contact surface, whereby at least two of the interior contact surfaces are oriented differently, with the first and the third rollers each being, in the vertical direction, in contact with and able to roll off on the first and/or the third interior contact surface of the profile rail, and the second rollers each being, in the lateral direction in contact with and able to roll off on the second interior contact surface of the profile rail.

In illustrative embodiments, this provides a simple to manufacture ring shaped profile rail, preferably made from metal, which, by virtue of its shape, meets the requirements of differently oriented interior contact surfaces. Moreover, owing to the respective fully circumferential profiled shape, the profile rail is of light weight. This reduces the total weight of the rotational device because, besides the profile rail, merely the rollers with corresponding fixation means are provided. A ring shape also enables savings in weight and space because the opening if the ring provides space for further elements.

In illustrative embodiments, the C shaped or U shaped ring shaped profile rail may open towards the inside in the direction of the rotational axis or towards the outside facing away from the rotational axis, allowing the design to be flexible depending on the respective application. Then, depending on the opening, the rollers engage into the profile rail from the outside or the inside so that in both cases simple assembly can be provided.

In illustrative embodiments, it is provided for several rollers of differing orientations, preferably three rollers of differing orientations, are mounted in a rail guide element rotatable about their roller axes in such a way that the rollers of a rail guide element are in contact with and can roll off on several interior contact surfaces of the profile rail of differing orientations. Consequently, several rollers are combined into one rail guide element or, respectively, into one component thereby simplifying assembly. Hereby, each rail guide element in and of itself may lead to a certain degree of limitation of movement because rollers with differing orientations are provided that are in contact with interior contact surfaces of differing orientations. By means of a correspondingly coordinated assembly of several such rail guide elements it is possible to mount the profile rail securely and reliably and to achieve a restriction of movement to the rotational degree of freedom about the rotational axis.

In illustrative embodiments, it is provided for each roller of a rail guide element to be in contact with and rolls off on another interior contact surface of the profile rail and a rotational device having at least three, preferably four, rail guide elements that define a circle lying concentrically in relating to the ring shaped profile rail. The advantageous result of this is that each roller restricts another direction and, therewith, only so many rollers are used as directions of movement are to be restricted, preferably vertically upwards and vertically downwards as well as laterally inwards or laterally outwards (depending on the opening of the profile), correspondingly, three rollers with differing orientations. This makes for a save on materials.

In illustrative embodiments, by virtue of the cooperation of several such rail guide elements, it is possible to attain a secure and reliable guidance and, besides the complete restriction of movement in the vertical direction, also a complete restriction of movement in the lateral direction. This is because each rail guide element in its own right is capable of preventing lateral movement of the profile rail in merely one direction, i.e. directed towards the axis of symmetry or away from the axis of symmetry (depending on the opening of the C profile). However, any lifting off of the profile rail from the respective roller can be preventing using rail guide elements designed in this way only in that another rail guide element is arranged, for example at the opposite position of the circle created by the rail guide elements. This can block the movement into the respective other lateral direction because it is correspondingly mirrored along the axis of symmetry of the profile rail. Thus, using four rail guide elements distributed evenly on the circle K, it is possible to attain a restriction of movement on the rotational degree of freedom.

In illustrative embodiments, it is further provided for each rail guide element to be provided with a base corpus having a second base corpus with a second bracket, the second bracket being sub-divided into several partial regions, where on each partial region one roller is rotatable mounted and aligned with its roller axis in such a way that the rollers of a rail guide element are in contact with several differently oriented interior contact surfaces of the profile rail, preferably, with each roller being in contact with and able to roll off on another interior contact surface of the profile rail.

In illustrative embodiments, owing to the subdivision into partial regions these can be adapted independent of each other so that the roller axes, too, can be adjusted correspondingly. In particular, it is provided for the partial regions to be de-coupled in their movement, at least in certain regions, structurally and/or by notches. Thus, each partial region is resilient, within certain boundaries, and is able to yield suitably in the event of production and position tolerances without significantly influencing another partial region.

In illustrative embodiments, in order to improve this, the second bracket may even be designed with a bend in total that allows a compensation of production and position tolerances, for example, when a rail guide element has been mounted wrongly and all partial regions yield equally.

In illustrative embodiments, it may further be provided for a ring shaped gear ring to be formed on the ring shaped profile rail that cooperates with an electrically or manually actuated rotation mechanism so as to manually or automatically cause a rotation of the profile rail about the rotational axis or for blocking the set rotation of the profile rail.

In illustrative embodiments, a vehicle seat having a rotational device according to the present disclosure is provided, whereby the vehicle seat can be rotated, preferably rotated completely, in relation to the vehicle floor about the rotational axis by means of the rotational device.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
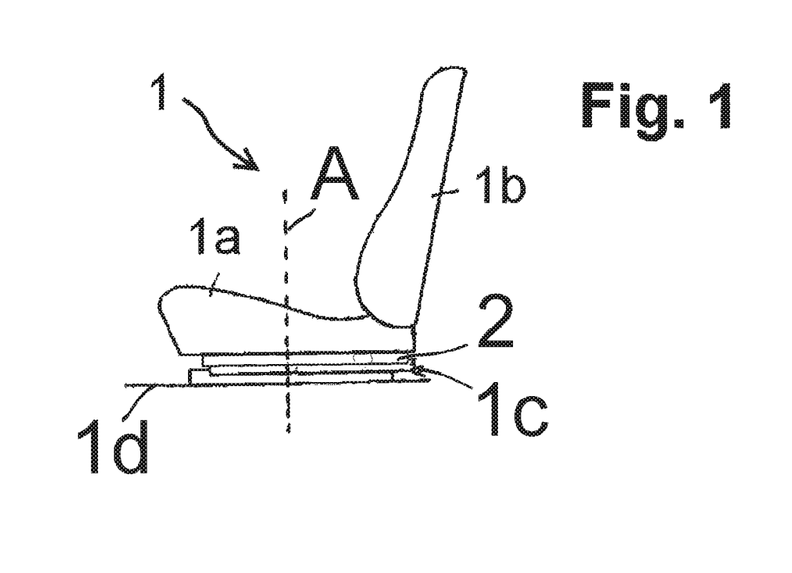
FIG. 1 is a sectional view of a vehicle seat with a rotational device.

According to FIG. 1 a vehicle seat 1 having a seat portion 1a and a back rest 1b is shown, whereby the vehicle seat 1 is connected to the vehicle floor 1d via a longitudinal adjustment device 1c in such a way that it can be longitudinally displaced. Furthermore, the vehicle seat 1 can be twisted or, respectively, rotated about a rotational axis A by means of a rotational device 2 shown merely schematically in FIG. 1. This can be used, for example, as an aid for easy access. In FIG. 1, the rotational device 2 is arranged between the longitudinal adjustment device 1c and the vehicle seat 1 or, respectively, the seat portion 1a. In principle, however, the rotational device 2 may be arranged between the vehicle floor 1d and the longitudinal adjustment device 1c and, in this position, guarantee a twisting about the rotational axis A.

Figure 2:
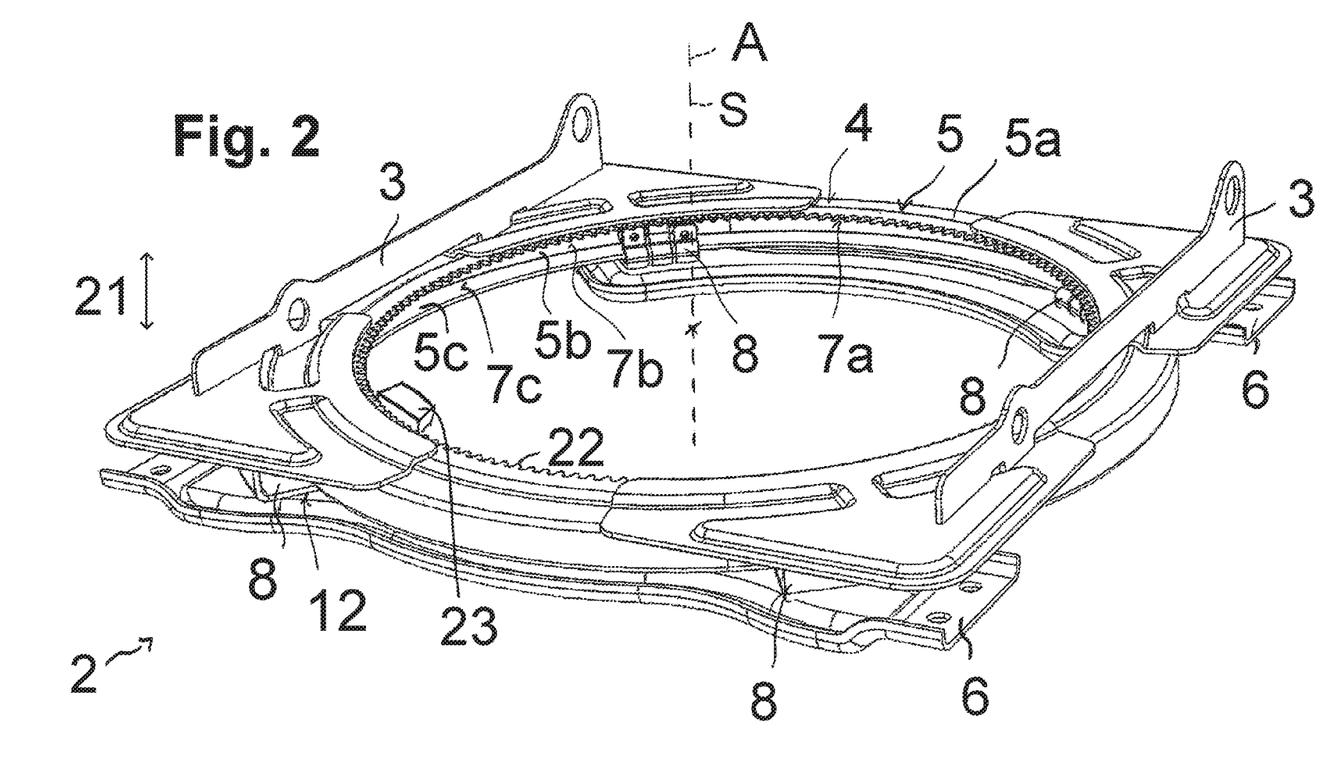
FIGS. 2 and 3 are perspective views of a rotational device according to the present disclosure for the vehicle seat according to FIG. 1.
Figure 3:
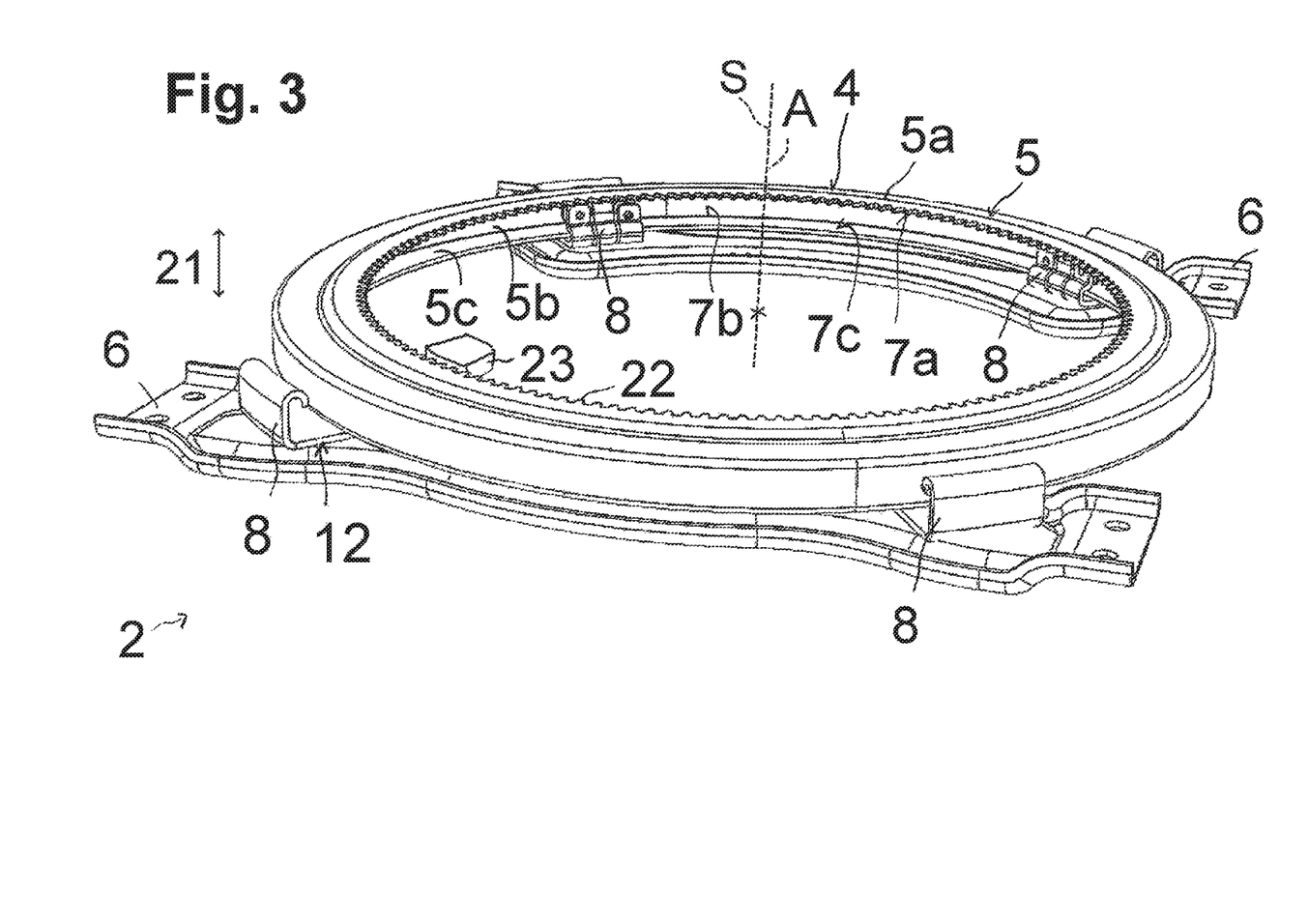

The rotational device 2 is shown in the FIGS. 2 and 3 both in a perspective view without the mounted vehicle seat 1. Hereby, according to FIG. 2, it is provided for the rotational device 2 to have two upper connecting elements 3 in the form of frames that serve to connect the rotational device 2 to the vehicle seat 1, whereby, for example, the seat frame of the seating portion 1a can be affixed to the two upper connecting elements 3. This makes the upper connecting elements 3 according to this embodiment firmly attached to the seat. The upper connecting elements 3 are mounted on a ring shaped profile rail 5, whereby, to that end the upper connecting elements 3 are each in contact or, respectively, suitably joined face to face, via an angled surface, with an outer contact surface 4 of an upper bar 5a of the ring shaped profile rail 5.

On the underside the rotational device 2 is provided with two lower connecting elements 6 in the form of tie bars that serve to connect the rotational device 2 to the vehicle floor 1d or, respectively, to the longitudinal adjustment device 1c in relation to which the vehicle seat 1 is able to rotate. The lower connecting elements 6 are movable connected via several rail guide elements 8 to the ring shaped profile rail 5, with the rail guide elements 8 guiding the ring shaped profile rail 5 such that the profile rail 5 rotates about the rotational axis A or, respectively, about its own axis of symmetry S. Thus, the lower connecting elements 6 can be rotated in relation to the ring shaped profile rail 5 and, therewith, also in relation to the upper connecting elements 3 about the rotational axis A. This makes it possible for the vehicle seat 1 affixed to the upper connecting elements 3 of the rotational device 2 to be rotated in relation to the vehicle floor 1d which may be connected via the lower connecting elements 6 to the rotational device 2 in a longitudinally displaceable manner.

Figure 4:
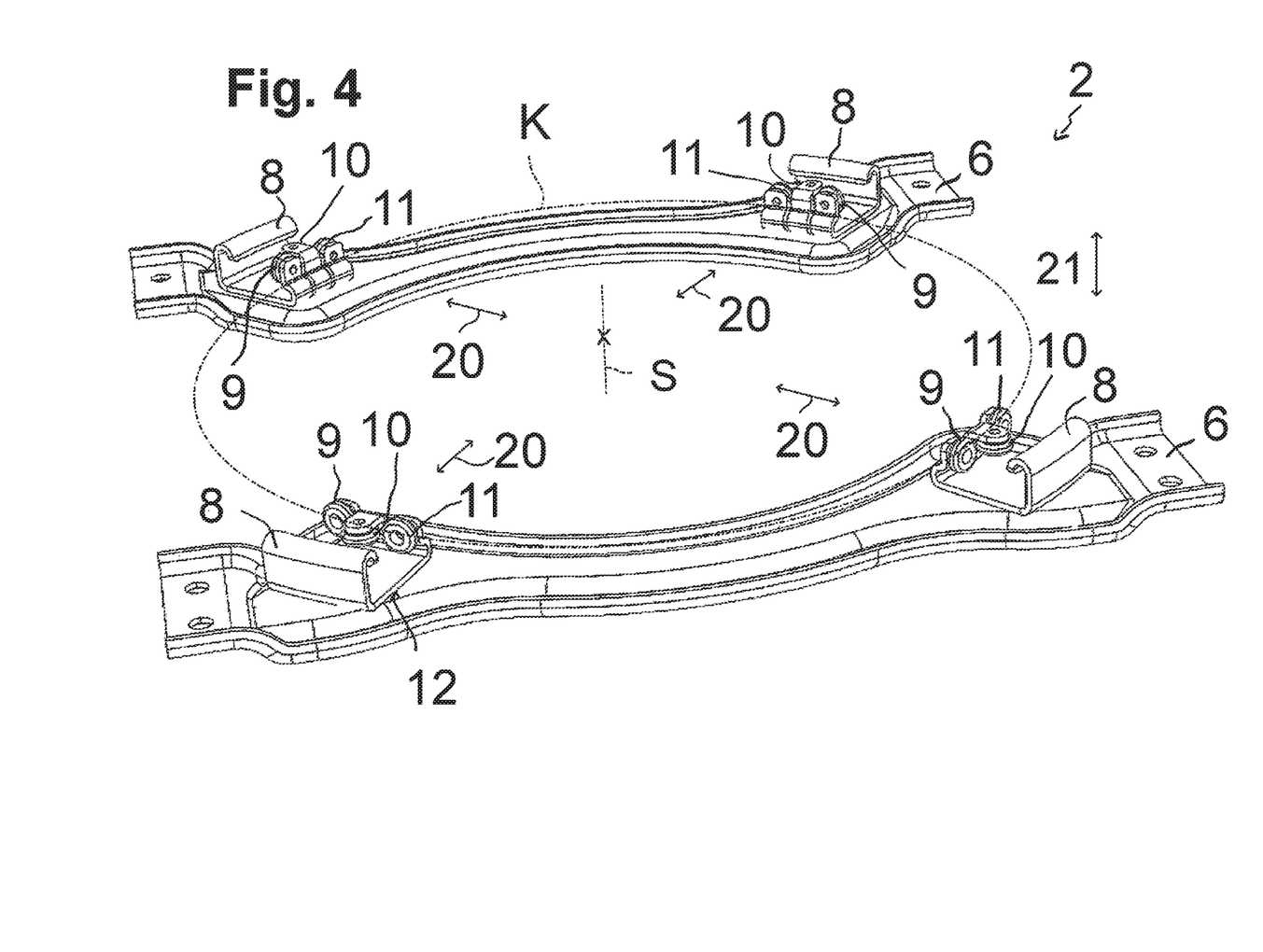
FIG. 4 is a view showing lower connecting elements of the rotational device according to FIGS. 2 and 3.

Now, according to FIG. 3 it shall be illustrated how the rotation about the rotational axis A can be provided. In the embodiments shown, four rail guide elements 8 are provided which define a circle K on which they are arranged at equal distances, i.e. offset against each other by an angle of 90°. Different sub-divisions of the circle are also possible comprising the same or a different number of rail guide elements 8. Also, the rail guide elements 8 are firmly attached to the two lower connecting elements 6, whereby, according to this embodiment, always two rail guide elements 8 are mounted in a suitable manner on a lower connecting element 6, as shown in FIG. 4. In the assembled state of the rotational device 2 or, respectively, of the lower connecting elements 6 the approximate position of the rail guide elements 8 and, therewith, of the circle K, too, is precisely determined.

The rail guide elements 8 each engage from the inside with the ring shaped profile rail 5 shaped as a U profile, with the U profile, hereby, being open inwards towards the axis of symmetry S of the profile rail 5. The shape of a C profile open towards the axis of symmetry S is also possible. Hereby, a guided rotational movement of the ring shaped profile rail 5 is made possible in that each rail guide element 8 comprises several rollers 9, 10, 11 which are in contact with the three interior contact surfaces 7a, 7b, 7c formed by the U profile on the inside of the ring shaped profile rail 5 in the lateral direction 20 and in the vertical direction 21. Hereby, the vertical direction 21 is in relation to the direction running parallel to the rotational axis A, while the lateral direction 20 is in relation to a direction aligned perpendicular, staring from the point observed, to the rotational axis A of the profile rail 5.

To that end, according to FIG. 4, a first roller 9 is provided at each guide element 8 which is arranged on the rail guide element 8 and oriented in the vertical direction 21 in such a way that this is in contact with a first interior contact surface 7a on the upper bar 5a of the profile rail 5 and, in the event of a rotational movement, rolls off on this first interior contact surface 7a. A second roller 10 is arranged on the rail guide element 8 and oriented in the lateral direction 20, i.e. towards the rotational axis A in such a way that this this is in contact with a second interior contact surface 7b on a middle flange 5b of the ring shaped profile rail 5 and, in the event of a rotational movement, rolls off on this second interior contact surface 7b. A third roller 11 is arranged on the rail guide element 8 and oriented in the vertical direction 21 in such a way that this this is in contact with a third interior contact surface 7c on a lower Step 5c of the ring shaped profile rail 5 and, in the event of a rotational movement, rolls off on this third interior contact surface 7c.

Thus, by means of each rail guide element 8 alone, it is possible to effect a limitation of movement of the ring shaped profile rail 5 shaped as a U profile both in the vertical direction 21 upwards and downwards and in the lateral direction 20 towards the axis of symmetry S or, respectively, towards the rotational axis A. Thus, a single rail guide element 8 is merely incapable of preventing the profile rail 5 from lifting off from the second roller 10 in the lateral direction 20 away from the axis of symmetry S or, respectively, from the rotational axis A. This can be provided, however, by the cooperation and the arrangement of the multiplicity of rail guide elements 8, totaling four in this embodiment example.

To that end, firstly, one has to make sure that the circle K formed by the four rail guide elements 8 extends concentrically in relation to the ring shaped profile rail 5, i.e. has the same center. Further, the circle K has to be determined by means of correspondingly positioning the rail guide elements 8 in such a way that always the first and third rollers 9, 11 of the rail guide element 8 are in contact with and roll off on the first or, respectively, third interior contact surface 7a, 7c, while, at the same time, always the second rollers 10 of the rail guide element 8 are in contact with and can roll off on the second interior contact surface 7b of the profile rail 5. Then, second rollers 10 of opposing rail guide elements 8 can the already prevent the profile rail 5 from lifting off in the lateral direction away from the axis of symmetry S so that a restriction of movement also in this direction can be provided. Thus, the profile rail 5 can be purposefully guided and exhibits merely the rotational degree of freedom about the rotational axis A.

Hereby, the exact adjustment of the circle K may happen during assembly of the two lower connecting elements 6, whereby, in the process of assembling or, optionally, after the fact in an adjustment process, for example, a relative position of the two tie bars 6 in relation to one another can be purposefully adapted. Hereby, it is possible to adjust, purposefully and individually, opposite and/or adjacent rail guide elements 8 on different tie bars 6 in relation to one another in order to be able to purposefully adjust the position of the rollers 9, 10, 11. In addition or alternatively, the rail guide elements 8 may be connected to the lower connecting elements 6 also via a detachable connection, for example via a screwed oblong hole attachment, rendering a later fine adjustment possible.

Figure 5A:
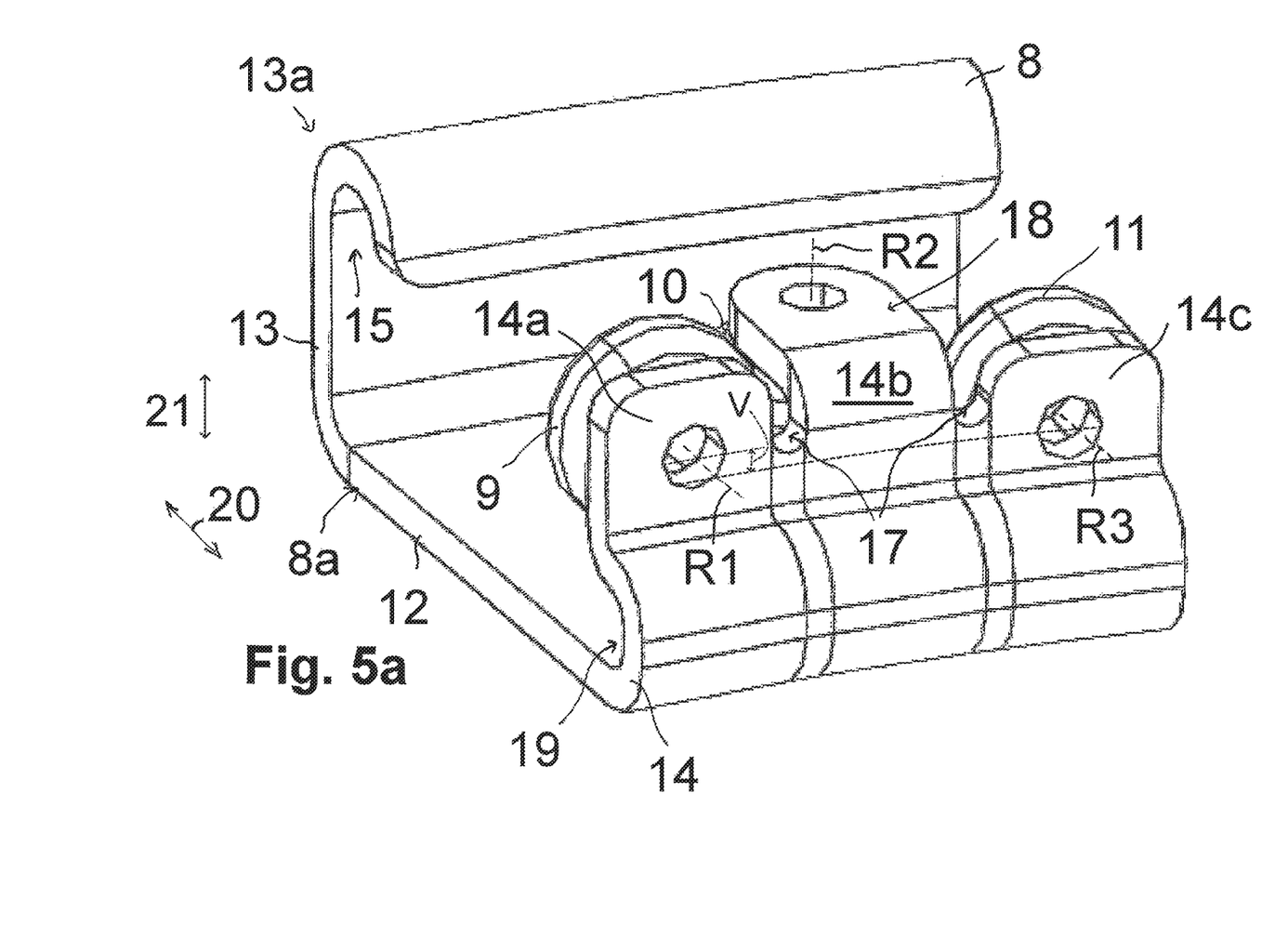
FIGS. 5a, 5b, 5c are detailed views of a rail guide element of the rotational device according to the present disclosure.
Figure 5B:
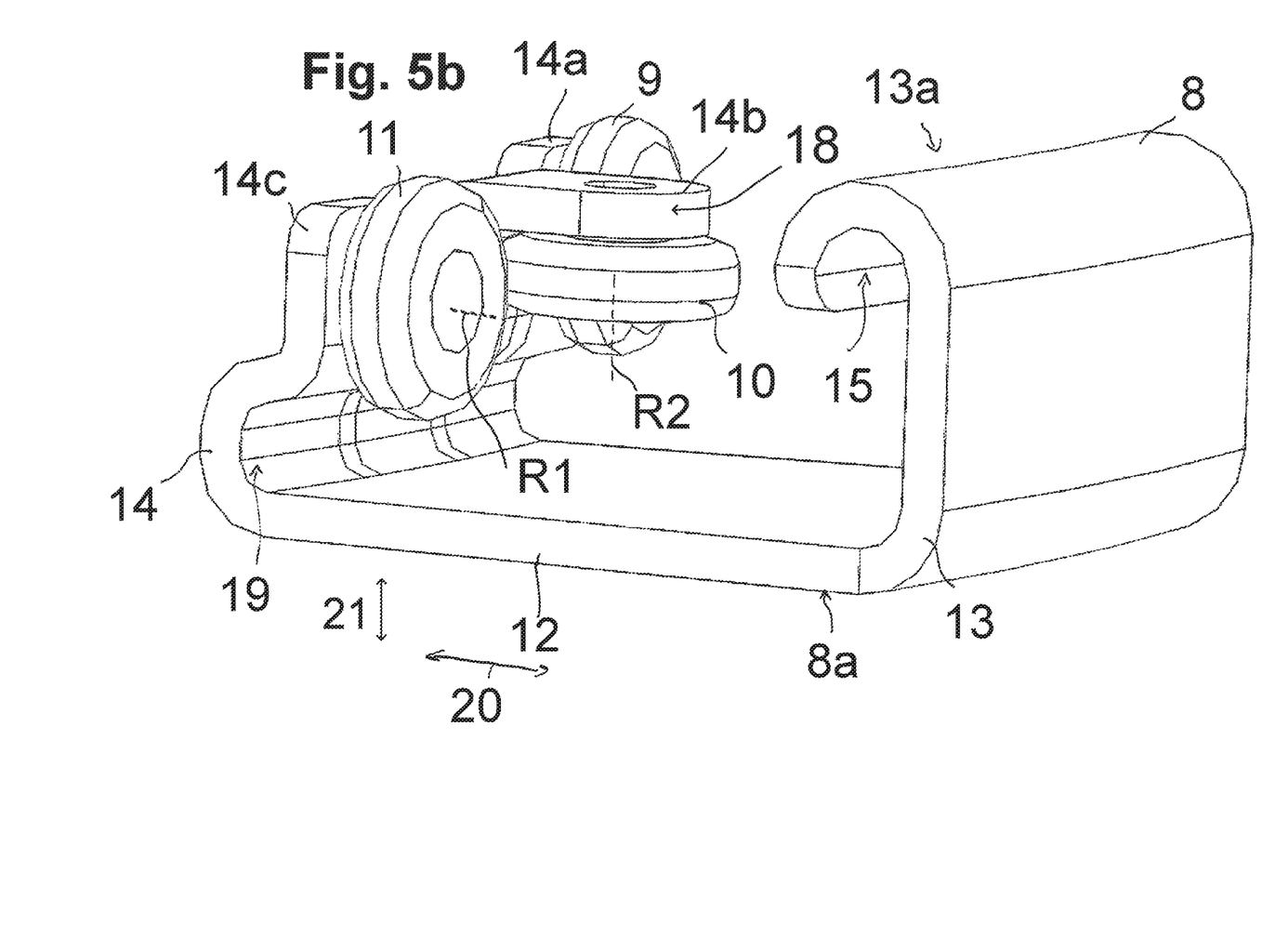
Figure 5C:
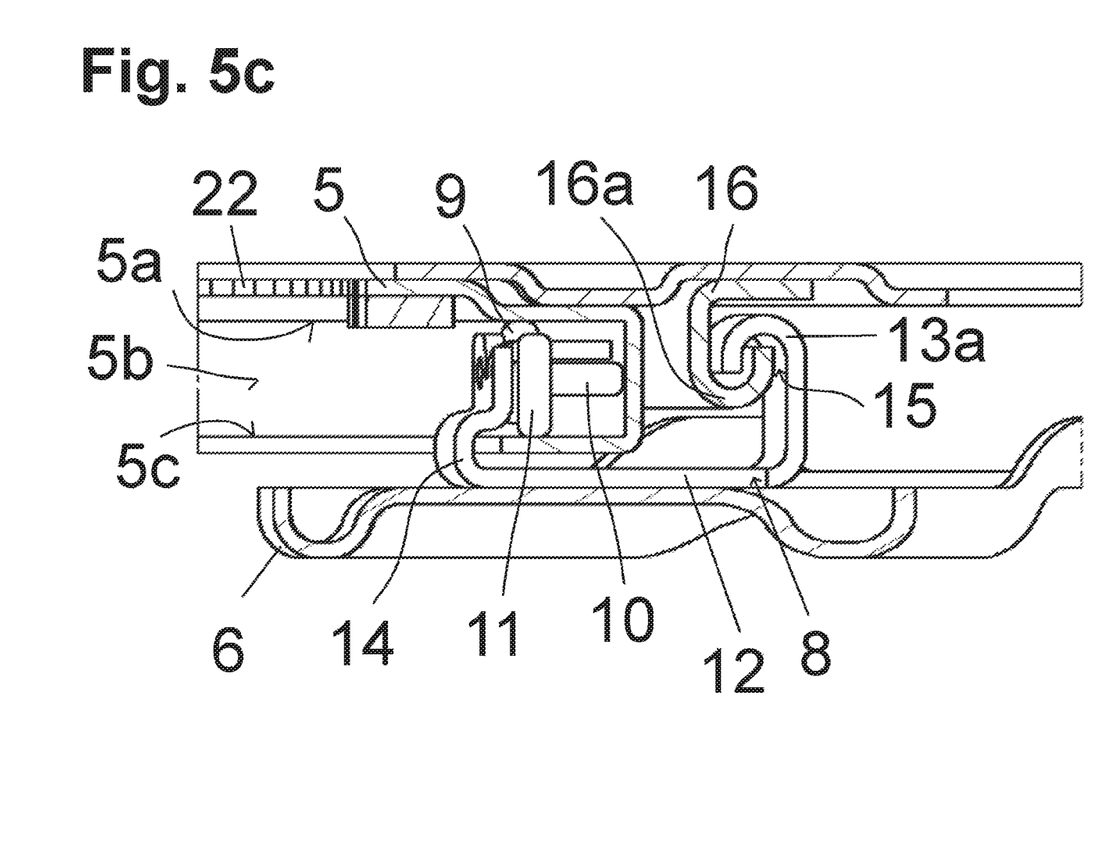

A rail guide element 8 is shown in detail in the FIGS. 5a, 5b and 5c, wherein such an element comprises a metal base corpus 8a which can be attached by means of an exterior flange 12 to the lower connecting elements 6, as shown in FIG. 4. Hereby, the attachment can be made by means of a screw connection or a rivet joint or a welding joint so that the respective rail guide element 8 is securely affixed to the respective tie bar 6. As mentioned above, it is also possible to utilize an oblong hole attachment so that the rail guide element 8 can be purposefully positioned with the contact flange 12 on the lower connecting elements 6 and later still be displaced during assembly of the rotational device 2 for a fine adjustment to define the circle K.

Starting from the contact flange 12 two brackets 13, 14 project off of the ends, these being formed by bending the base corpus 8*a* upwards. The first bracket 13 is in turn bent in a U shape at its upper side 13*a* so as to form a U shaped stop 15. Hereby, this stop 15 serves to protect the profile rail 5 in absorbing additional forces in the event that this should lift off in the vertical direction 21 from the first roller 9 and the third roller 11 of the respective rail guide element 8. To that end, as shown in FIG. 5*c*, a securing rail 16 may project off of the profile rail 5 downwards in the vertical direction 21, the securing rail being bent in a U shape at its end region 16*a* in such a way that the stop 15 and the securing rail 16 engage with one another without touching in normal operation. When a force acts on the profile rail 5 in the vertical direction 21 any lifting off from the rail guide element 8 is prevented because the securing rail 16 with its U shaped end region 16*a* comes to rest against the 15 and any further lifting off is blocked. In embodiment shown, the first bracket 13, with reference to the axis of symmetry S of the profile rail 5, faces outwards.

Starting from the contact flange 12 a second bracket 14 is also bent upwards and, thereby, subdivided into three partial regions 14*a*, 14*b*, 14*c*. Hereby, the subdivision may be structural in nature and/or, as can be seen in FIG. 5*a*, formed by incisions or, respectively, notches 17. In a so created first partial region 14*a* the first roller 9 is mounted rotatable about a first roller axis R1. Hereby the first roller axis R1 is extended in the lateral direction 20 and defined such that the first roller 9 in its assembled state is in contact with the first interior contact surface 7*a* on the upper bar 5*a* of the ring shaped profile rail 5 and is able to roll off thereon across the full circumference. Thus, the first roller axis R1 is suitably oriented in the vertical direction 21 upwards.

The second partial region 14*b* is bent in its upper region 18 so that this bent region 18 is oriented approximately parallel to the contact flange 12. In the bent region 18 the second roller 10 is mounted rotatable about a second roller axis R2. Hereby, the second roller axis R2 is extended in the vertical direction 21 and, therewith, perpendicular to the first roller axis R1 and defined such that the second roller 10 in its assembled state is in contact with the second interior contact surface 7*b* on the middle flange 5*b* of the ring shaped profile rail 5 and is able to roll off thereon across the full circumference. Thus, the second roller axis R2 is suitably oriented in the lateral direction 20 facing outwards (with reference to the axis of symmetry S or, respectively, the rotational axis A).

The third partial region 14*c* is designed similar to the first partial region 14*a*, with the difference that a third roller axis R3, about which the third roller 11 is rotating mounted, is arranged with an offset V to the first roller axis R1. Hereby, it is achieved that the third roller 11 in the assembled state is in contact with the third interior contact surface 7*b* on the lower bar 5*c* of the ring shaped profile rail 5 and is able to roll off thereon across the full circumference. Thus, the third roller axis R3 is suitably oriented in the vertical direction 21 facing downwards.

Due to the bend 19 arranged in the lower region of the second bracket 14 the individual partial regions 14*a*, 14*b*, 14*c* are flexible at least in the lateral direction 20 so that production and positional tolerances can be compensated. By virtue of the notches 17 the individual partial regions 14*a*, 14*b*, 14*c* are able to yield in relation to one another within certain limits even independent of each another so as to be able to compensate for production and positional tolerances independent of each another. Moreover, the bent region 18 of the second partial region 14*b* is flexible in the vertical direction 21 so that in this second partial region 14*b* production and positional tolerances can be compensated also in this direction.

Thus, by sub-dividing the second bracket 14 holding the roller 9, 10, 11 in three partial regions 14*a*, 14*b*, 14*c* it is possible to
create two roller axes R1, R3 oriented in the lateral direction 20 for the first and the third roller 9, 11 to guarantee rolling off on the first and third interior contact surface 7*a*, 7*c*, and
forming a roller axis R2 oriented in the vertical direction 21 for the second roller 10 to guarantee rolling off on the second interior contact surface 7*b*, and, thereby, to attain the desired restriction of movement.

Because all rail guide elements 8 are designed in this way and positioned in relation to one another accordingly it is possible to attain a restriction to the rotational degree of freedom while, at the same time, having a reliable guidance of the profile rail 5. Tolerances can be compensated in a simple manner by the respectively flexible partial regions 14*a*, 14*b*, 14*c* so that the profile rail 5 in the rotational device 2 does not wobble or, respectively, rattle and, at the same time, a simple and comfortable rotational movement with a minimum of force needed can be attained.

As a further embodiment, not shown, it may be provided that the ring shaped profile rail 5, which is designed as a U profile as described above or as a C profile, opens outwards in relation to the axis of symmetry S, i.e. facing away from the axis of symmetry S. Consequently, in contrast to the embodiment described above and shown here, the profile rail 5 is quasi mirrored towards the outside. Thus, in order to attain a rotating guide of such a profile rail 5, the rail guide elements 8 are mirrored correspondingly, too. Thus, the rollers 9, 10, 11 engage, via the second Bracket 14 in this embodiment not shown, with the interior of the profile rail 5 from the outside and, in a manner similar to the shown embodiment example, are in contact with the interior contact surfaces 7*a*, 7*b*, 7*c* of the profile rail 5 which are then open towards the outside. The adjustment of the relative positions of the rail guide elements 8 then happens in as similar manner such that a circle K is defined by the rail guide elements 8 which is positioned concentrically in relation to the ring shaped profile rail 5 open towards the outside, whereby, again, the positions of the roller axes R1, R2, R3 has to be tuned accordingly.

According to the embodiment shown in FIG. 2 and FIG. 3, a gear ring 22 may be arranged on the entire circumference on the upper bar 5*a* of the ring shaped profile rail 5 via which the profile rail 5 can purposefully cooperate with a rotating mechanism 23, which is shown here merely in schematic form. The rotating mechanism 23 may be manually or electrically actuated and cooperate with the gear ring 22 in any suitable manner, e.g. via a gear wheel. By virtue of the rotating mechanism 23 it is possibly to effect either a manual or an automated rotation of the vehicle seat 1 via the rotational device 2 as well as a fixation or, respectively, blocking of the set rotational position. In addition hereto or alternatively, however, other mechanical blocking mechanism may be provided which, e.g. upon manual actuation of, for example, a lever, prevent any twisting of the profile rail 5 guided by the rail guide elements 8.

Seats, in particular vehicle seats, may often comprise various adjustment means so as to facilitate the use of the vehicle seat. Thus, for example, a passenger can make a purposeful longitudinal adjustment of the vehicle seat by means of a suitable adjustment mechanism. Also, inclination of the back rest of the vehicle seat may be adjusted so that the passenger can purposefully set the inclination desired. Furthermore, vehicle seats can be rotated or swiveled about a certain rotational axis, for example, in order to facilitate getting in or, respectively, mounting. To that end, a rotational device or, respectively, a swivel device may be provided at a suitable position between the seat frame of the vehicle seat and the vehicle floor of the vehicle, allowing the vehicle seat to be rotated or pivoted in relation to the vehicle floor.

In one comparative device, for example, a curved slide way mechanism is may be described as a rotational device, wherein an upper seat shell connected to the vehicle seat is mounted via a ball bearing so as to pivot in relation to a lower seat shell. Hereby, the balls of the ball bearing lie between slide rails designed as arched circle segments so that the upper slide rail, which is connected to the upper seat shell, is able to pivot via the rolling off balls of the ball bearing along the circle segment in relation to the lower slide rail which is connected to the lower seat shell. Thus, the pivoting motion is limited by the dimension of the circle segment of the arched slide rails so that rotation is possible by an angle of up to 50°. Hereby, however, the vehicle seat does not rotate about its axis of symmetry but pivots about a rotational axis which is determined by a hinge-type rotating mechanism at the edge of the rotational device.

In another comparative rotational device, the rotational device causes the vehicle seat to swivel out. It is a disadvantage so these solutions that no full rotation of the vehicle seat is possible, and, also, that the vehicle seat swivel out, thereby creating a high space requirement because the vehicle seat rotates about a rotational axis which is offset from the axis of symmetry.

In yet another comparative rotational device, the rotational device includes a ball bearing mounted rotational device enabling a rotation about the axis of symmetry of the vehicle seat. Hereby, there is the disadvantage, as is the case with other ball bearings, that these have high rolling resistances. Moreover, production and positional tolerances can be compensated only with considerable effort.

In yet another comparative rotational device, the rotational device allows for a rotation of the vehicle seat about its axis of symmetry. Hereby, it is provided for the washer to be mounted via several rollers, these several rollers being in contact with the outer perimeter of the washer at regular intervals and able to roll off thereon. Hereby, the rollers each comprise a groove into which the outer perimeter of the washer engages so that the washer is rotating guided by the rollers. The washer can be connected to the vehicle seat, and the rollers that are mounted via two plates and serve as rail guide element can be attached to the floor of the vehicle. A disadvantage in this solution is that it is very complex to assemble and production and positional tolerances can be compensated only with considerable effort. Moreover, the running properties when turning under high load, in particular, in the vertical direction, may be compromised due to the mounting of the washer.

In yet another comparative rotational device, a ring shaped profile rail designed as a C profile, which can be connected to a vehicle seat and is open at the bottom, lies on top of several rollers. The rollers are rotating mounted on bars of an approximately semi-ring shaped U profile which is open at the top, whereby such a U profile is provided in duplicate and can be connected to the floor of the vehicle. Hereby, the two U profile with the rollers serve as rail guide element seating or, respectively, guiding the ring shaped profile rail upon being rotated. When rotated the rollers can roll off on interior contact surfaces of the ring shaped profile rail. A lateral stop on the rollers prevents the engaging profiles from being offset against each other so that rattling noise is prevented.

Hereby, it is a disadvantage that in such a construction it is hard to compensate for production and positional tolerances since the positions of the rollers in the respective rail guide element are determined and the U profiles are not yielding. It is hard to compensate for production and positional tolerances in the vertical direction because the bar heights of the C profile and, likewise, the diameter of the rollers are determined. If there should be deviations the C profile may be lifted off the rollers in the vertical direction, thereby possibly creating a rattling noise. In case of roller diameters being too large, in turn, the running properties may be compromised by an increased rolling friction. If there should be differences in the radii of the U profiles in relation to the radius of the C shaped profile rail, in which is U profiles run with their rollers, then is it also possible for the rolling friction to be compromised. Moreover, the expenditure in materials is increased because the rail guide elements or, respectively, the U profile holding the rollers is extended across the entire semi-ring.

The invention claimed is:

1. A rotational device for a vehicle seat, the rotational device comprising
    an upper connecting element for connecting the rotational device to the vehicle seat,
    a lower connecting element for connecting the rotational device to a vehicle floor, and
    a ring shaped profile rail,
    the ring shaped profile rail being guided by several rollers in a manner rotatable about a rotational axis, the several rollers each being mounted in a manner rotatable about roller axes, and the rollers being in contact with the profile rail at interior contact surfaces in such a way that the rollers, upon rotation of the profile rail, roll on the interior contact surfaces thereby guiding the profile rail in its rotational movement about the rotational axis, the upper connecting element being connected via the ring shaped profile rail to the lower connecting element in such a way that these can be twisted in relation to one another,
    wherein the roller axes of the several rollers are determined such that the rollers are in contact with and able to roll on several interior contact surfaces of the profile rail with differing orientations, with each roller itself being in contact with and able to roll on one of the several interior contact surfaces of the profile rail, and
    wherein the roller axes of the rollers are arranged such that first roller axes of first rollers and third roller axes of third rollers each extend in a lateral direction, and second roller axes of second rollers extend in a vertical direction, whereby the first and the third roller axes are arranged such that the first and the third rollers are each in contact with the profile rail in the vertical direction, and the second roller axes are arranged such that the second rollers are each in contact with the profile rail in the lateral direction.

2. The rotational device of claim 1, wherein the laterally extending first roller axes are offset against the laterally extending third roller axes by an offset such that the first rollers are in contact with other interior contact surfaces on the profile rail in the vertical direction than the third rollers.

3. The rotational device of claim 1, wherein the ring shaped profile rail is designed as a C shaped or U shaped ring shaped profile rail having an upper bar, a middle flange, and a lower bar, the upper bar forming a first interior contact surface, the middle flange forming a second interior contact surface, and the lower bar forming a third interior contact surface, where at least two of the interior contact surfaces have differing orientations, the first and the third rollers each being in contact with the first and/or the third interior contact surface of the profile rail in the vertical direction, and the second rollers each being in contact with the second interior contact surface of the profile rail in the lateral direction.

4. The rotational device of claim 3, wherein the C shaped or U shaped ring shaped profile rail is open inwards in the direction of the rotational axis or outwards facing away from the rotational axis.

5. The rotational device of claim 1, wherein the several rollers with differing orientations are mounted in a rail guide element in a manner rotatable about their roller axes such that the rollers of a rail guide element are in contact with and roll on several interior contact surfaces of the profile rail with differing orientations.

6. The rotational device of claim 5, wherein each roller of a rail guide element is in contact with and rolls on another interior contact surface of the profile rail.

7. The rotational device of claim 6, wherein the rotational device comprises at least three rail guide elements which define a circle which lies concentrically to the ring shaped profile rail.

8. The rotational device of claim 7, wherein each rail guide element comprises a base corpus with a second bracket, the second bracket being subdivided into several partial regions, where on each partial region a roller of the several rollers is rotatingly mounted.

9. The rotational device of claim 8, wherein the second bracket is formed by a bend so as to compensate for production and positional tolerances.

10. The rotational device of claim 9, wherein the partial regions are de-coupled from one another in their movement, at least in certain regions, structurally and/or by means of notches.

11. The rotational device of claim 8, wherein a first partial region with the first roller and a third partial region with the third roller each extend in the vertical direction, the first and the third roller axis extending in the lateral direction through the first and the third partial region, and a second partial region having a bent region extending in the lateral direction, where the second roller axis extends in the vertical direction through the bent region of the second partial region.

12. The rotational device of claim 11, wherein each rail guide element comprises at least three rollers.

13. The rotational device of claim 6, wherein a rotational device comprises at least four rail guide elements which define a circle which lies concentrically to the ring shaped profile rail.

14. The rotational device of claim 1, wherein the several rollers are arranged, and the roller axes of these rollers are oriented, to cause a complete restriction of movement of the profile rail in the lateral direction and in the vertical direction so that the profile rail merely has a rotational degree of freedom about the rotational axis.

15. The rotational device of claim 1, wherein the rotational axis lies on an axis of symmetry of the profile rail.

16. The rotational device of claim 1, wherein the profile rail, guided by the several rollers, can be fully twisted.

17. A vehicle seat including the rotational device of claim 1, wherein the vehicle seat can be twisted by means of the rotational device in relation to the vehicle floor about the rotational axis.

18. A rotational device for a vehicle seat, the rotational device comprising
an upper connecting element for connecting the rotational device to the vehicle seat,
a lower connecting element for connecting the rotational device to a vehicle floor, and
a ring shaped profile rail,
the ring shaped profile rail being guided by several rollers in a manner rotatable about a rotational axis, the several rollers each being mounted in a manner rotatable about roller axes, and the rollers being in contact with the profile rail at interior contact surfaces in such a way that the rollers upon rotation of the profile rail roll on the interior contact surfaces thereby guiding the profile rail in its rotational movement about the rotational axis, the upper connecting element being connected via the ring shaped profile rail to the lower connecting element in such a way that these can be twisted in relation to one another,
wherein the roller axes of the several rollers are determined such that the rollers are in contact with and able to roll on several interior contact surfaces of the profile rail with differing orientations, with each roller itself being in contact with and able to roll on one of the several interior contact surfaces of the profile rail, and
wherein a circumferential gear ring is formed on the ring shaped profile rail which cooperates with a rotating mechanism to manually or automatically cause a rotation of the profile rail about the rotational axis or for blocking a set rotational position of the profile rail.

19. The rotational device of claim 18, wherein the roller axes of the rollers are arranged such that first roller axes of first rollers and third roller axes of third rollers each extend in a lateral direction, and second roller axes of second rollers extend in a vertical direction, whereby the first and the third roller axes are arranged such that the first and the third rollers are each in contact with the profile rail in the vertical direction, and the second roller axes are arranged such that the second rollers are each in contact with the profile rail in the lateral direction.

20. The rotational device of claim 19, wherein the laterally extending first roller axes are offset against the laterally extending third roller axes by an offset such that the first rollers are in contact with other interior contact surfaces on the profile rail in the vertical direction than the third rollers.

* * * * *